US012396071B2

(12) United States Patent
Kisner

(10) Patent No.: US 12,396,071 B2
(45) Date of Patent: Aug. 19, 2025

(54) INCREASE RESISTANCE FOR EFFICIENT HEATING

(71) Applicant: UT-Battelle, LLC, Oak Ridge, TN (US)

(72) Inventor: Roger A. Kisner, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 910 days.

(21) Appl. No.: 17/532,047

(22) Filed: Nov. 22, 2021

(65) Prior Publication Data

US 2022/0086964 A1 Mar. 17, 2022

Related U.S. Application Data

(62) Division of application No. 16/240,201, filed on Jan. 4, 2019, now Pat. No. 11,184,959.

(60) Provisional application No. 62/613,605, filed on Jan. 4, 2018.

(51) Int. Cl.
*H05B 6/12* (2006.01)
*H05B 6/06* (2006.01)
*H05B 6/10* (2006.01)

(52) U.S. Cl.
CPC ............... *H05B 6/12* (2013.01); *H05B 6/062* (2013.01); *H05B 6/105* (2013.01); *H05B 6/1209* (2013.01)

(58) Field of Classification Search
CPC . H05B 6/12; H05B 6/12; H05B 6/062; H05B 6/105
See application file for complete search history.

(56) References Cited

U.S. PATENT DOCUMENTS

| | | | | |
|---|---|---|---|---|
| 3,979,572 | A | 9/1976 | Ito et al. | |
| 4,564,001 | A | 1/1986 | Maeda | |
| 4,763,132 | A * | 8/1988 | Juds | H01P 1/00 333/248 |
| 5,552,112 | A | 9/1996 | Schiffmann et al. | |

(Continued)

OTHER PUBLICATIONS

Ma, X., "Modeling of Conductor Surface Roughness Effect", Master's Thesis, University of Illinois at Urbana-Champaign, 2014, pp. 1-44.

(Continued)

*Primary Examiner* — Brian W Jennison
(74) *Attorney, Agent, or Firm* — Scully, Scott, Murphy & Presser, P.C.

(57) ABSTRACT

Conductors for use in heating systems are provided. The conductors are configured to have an extended current path for the current and increased resistance as seen by the current. The heating system may be an induction system. For example, the conductor may comprise a conductive material having a surface which faces an induction coil of an oscillating circuit. This surface may have a predetermined pattern of peaks and valleys. The peaks and valleys form a non-linear current path for the induced current when exposed to an electromagnetic field generated by the oscillating circuit. Other conductors such as a heat pipe may be used. The pipe may have walls with varying thicknesses over its length. The varying thicknesses may include a first thickness and a second thickness which alternate. The heat pipe may be used in an induction or direct contact heating system where AC is directly applied to the pipe.

15 Claims, 11 Drawing Sheets

(56) References Cited

U.S. PATENT DOCUMENTS

| | | | | |
|---|---|---|---|---|
| 9,739,501 | B2 | 8/2017 | Klett et al. | |
| 2004/0188425 | A1 | 9/2004 | Besmann et al. | |
| 2009/0050622 | A1 | 2/2009 | Pohl et al. | |
| 2012/0271108 | A1* | 10/2012 | Hoshino | A61B 1/00091 600/139 |
| 2015/0229887 | A1* | 8/2015 | Kisner | H04N 23/56 348/84 |
| 2016/0057814 | A1 | 2/2016 | Klett et al. | |
| 2017/0245679 | A1 | 8/2017 | Watts | |
| 2020/0179160 | A1 | 6/2020 | Noah | |

OTHER PUBLICATIONS

Gold, G. et al., "A Physical Model for Skin Effect in Rough Surfaces", Proceedings of the 42nd European Microwave Conference, Oct. 29-Nov. 1, 2012, Amsterdam, the Netherlands, pp. 1011-1014.

Morgan, S., "Effect of Surface Roughness on Eddy Current Losses at Microwave Frequencies", Journal of Applied Physics, Apr. 1949, pp. 352-362, vol. 20, issue 352.

Amrhein, A. et al., "A Transformer-Coupled, Series-Resonant Topology for the Induction Heating of Aluminum Cookware", 9th International Conference on Power Electronics-ECCE Asia, Jun. 1-5, 2015, pp. 1234-1239.

Amrhein, A., "Induction Heating of Aluminum Cookware", Masters Thesis, May 21, 2015, Blacksburg, VA, pp. 1-78.

* cited by examiner

INCREASE RESISTANCE FOR EFFICIENT HEATING

CROSS REFERENCE TO RELATED APPLICATION

The present application claims benefit of U.S. Provisional Application No. 62/613,605, filed on Jan. 4, 2018, all of the contents of which are incorporated herein by reference.

GOVERNMENT SUPPORT

This application is a divisional application of U.S. application Ser. No. 16/240,201, filed Jan. 4, 2019, which claims benefit of U.S. Provisional Application No. 62/613,605, filed on Jan. 4, 2018, all of the contents of which are incorporated herein by reference.

FIELD OF THE DISCLOSURE

The present disclosure relates to heating systems and conductors therefor. The present disclosure relates to methods for increasing an effective resistance of conductors and increasing a current path and the corresponding conductors.

BACKGROUND

A conductor may be heated via induction or using alternating current (AC) directly connected to the conductor.

Induction heating is based on inducing an eddy current(s) in a conductive material by using an AC electromagnetic field generated by an oscillating circuit. The eddy currents cause Joules heating of the conductive material. Eddy currents are generated as a result of the AC electromagnetic field's depth of penetration of the material. The current is higher at the surface nearest the inducing coil and decreases with penetration.

Alternately, AC may be applied to a conductive material using clamps which are attached to the conductive material. For example, clamps may be attached to ends of the conductive material. High Frequency/High Current cables are attached to the clamps. These cables provide ground for the system. Another clamp may be connected to a midpoint between the other clamps. Another High Frequency/High Current cable is attached to the clamp. Current flows due to VAC and ground applied to the cables.

Current density in a conductive material is impacted by various factors including the skin depth. Skin depth impacts both an induced current (induction) or AC which is directly connected to a conductor. The skin depth is a function of resistivity, permeability, permittivity and frequency of the AC electromagnetic field or applied AC.

The induction heating is based on the eddy current(s) and resistance of the material as seen by the current(s). AC heating is based on the current directly connected (AC) and the resistance of the material as seen by the current. The resistance of the material as seen by the current is based on a resistivity of the material. A resistivity of the material is governed by the material type. Resistance of the material as seen by the current is a function of the resistivity and dimensions of the material (especially the dimensions of the current path). The skin depth and power increases with an increase in resistivity. However, there is a side-effect of heating conductive materials by using high-frequency currents, which is the same currents in the conductor also flows through components, such as, the inducing coil (induction heating) or connecting cables (AC direct application), other electronic components (including power electronics) and a work piece (target). This current may lead to unwanted heating in the connecting cables (AC direct application) and the other components (and inducing coil), and produce associated strain on the other electronic components.

SUMMARY

Accordingly, disclosed is a conductor for heating with increased resistance as seen by a current.

In an aspect of the disclosure, the conductor is configured to be exposed to an oscillating circuit having an induction coil. The oscillating circuit is configured to generate an electromagnetic field having an oscillating frequency. The conductor comprises a conductive material having a surface with a predetermined pattern of peaks and valleys. This surface when exposed to the oscillating circuit faces the induction coil. The peaks and valleys form a non-linear current path for the induced current when exposed to the electromagnetic field generated by the oscillating circuit.

In an aspect of the disclosure, the peaks and valleys are cyclically positioned along a length of the surface of the conductor. Additionally, in an aspect of the disclosure, a length of a peak and a length of a valley are equal in a direction of the induced current flow. The positioning and the configurations allow for an increase in the resistance evenly across a length of the surface of the conductor.

In an aspect of the disclosure, a length of a peak in a direction of the current flow is based on an oscillating frequency of the oscillating circuit. For example, the length of the peak may be twice the skin depth which is a function of the oscillating frequency.

In an aspect of the disclosure, a difference in height between a peak and a valley is based on an oscillating frequency of the oscillating circuit.

In an aspect of the disclosure, the conductive material has a gap disposed adjacent to and aligned with each peak, respectively. The gaps are configured to route the induced current though the adjacent peaks.

In an aspect of the disclosure, the arrangement of the valleys and peaks is based on a type of the induction coil, a shape of the surface and direction of current flow.

In an aspect of the disclosure, when the surface is circular, the peaks and valleys may be arranged radially to extend from a center of the surface and may alternate.

In an aspect of the disclosure, the conductor may be a graphite foam.

In an aspect of the disclosure, the conductor is used for cooking. For example, the conductor may be a pot, a pan, a coffee maker or a kettle. The cooking apparatus has a bottom surface having the predetermined pattern of peaks and valleys. The peaks and valleys are arranged radially extending from a center of the bottom. The peaks and valleys alternate.

Also disclosed is a conductive pipe. The conductive pipe comprises a wall, where a thickness of the wall varies over a length of the conductive pipe from a first end to a second end. The wall has at least a first thickness and a second thickness different from the first thickness. The first thickness and the second thickness alternate along the length of the wall from the first end to the second end. The wall, having the first thickness and the second thickness, forms a non-linear current path for current when exposed to an electromagnetic field generated by an oscillating circuit or alternating current directly connected.

In an aspect of the disclosure, the wall comprises an internal surface and an external surface. The external surface is corrugated to form the first thickness and the second thickness.

In an aspect of the disclosure, a distance between adjacent first thicknesses is the same. The positioning allows for an increase in the resistance evenly across a length of the surface of the conductive pipe.

In an aspect of the disclosure, the length of the first thickness may be based on an oscillating frequency of the oscillating circuit or a frequency of the AC.

In an aspect of the disclosure, a difference between a thickness of the first thickness and the second thickness is based on an oscillating frequency of the oscillating circuit or a frequency of the AC.

DETAILED DESCRIPTION

Figure 1:
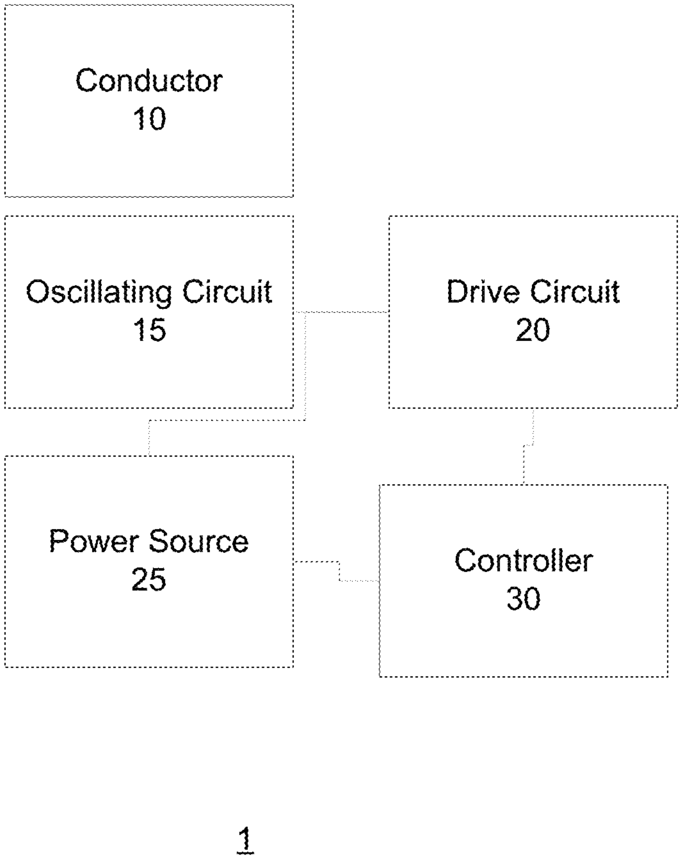
FIG. 1 is a block diagram of a heating system in accordance with aspects of the disclosure.

FIG. 1 depicts a heating system 1 according to aspects of the disclosure. As depicted, the heating system 1 is an induction heating system. The heating system 1 comprises a conductor 10, an oscillating circuit 15, a drive circuit 20, a power source 25 and a controller 30. The conductor 10 will be described in detail below.

The heating system 1 may be used to heat objects and materials for various applications including cooking, boiling water and heating gases. In other aspects of the disclosure, the system 1 may be used to heat salts. The system 1 may heat stationary or flowing fluids flowing. The target of the heating may be in direct contact with the conductor 10 or in proximity of the same.

Figure 6:
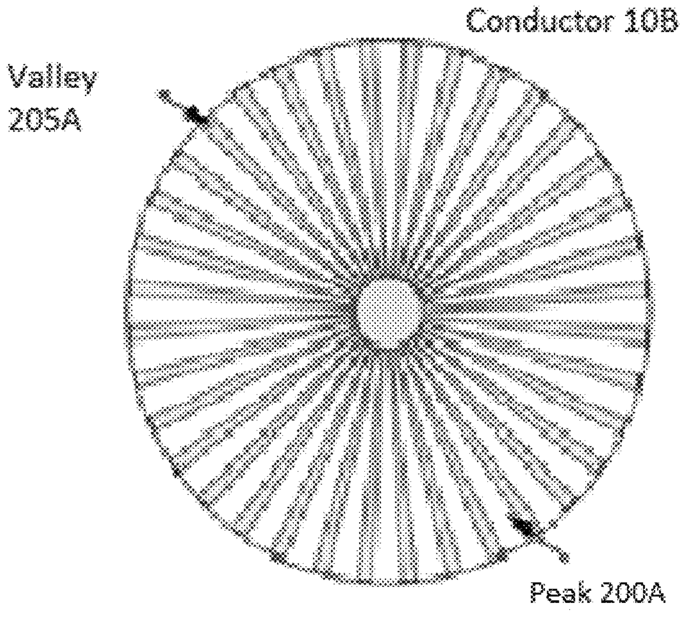
FIG. 6 is a plan view of another conductor in accordance with aspects of the disclosure having a circular shape.

The conductor 10 is in proximity to a source of a varying electromagnetic field (time varying) such as an oscillating circuit 15. For example, the conductor 10 is disposed within the electromagnetic field which is generated by the oscillating circuit 15. The conductor 10 when exposed to the electromagnetic field, results in an induced electric current which is also referred to herein as eddy current(s). The electric current heats the conductor 10. When the conductor 10 is used for cooking, the conductor may be a pot or a pan. In this aspect of the disclosure, the bottom surface of the pot or pan may have a predetermined pattern (of peaks and valleys), which are described herein. The peaks/valleys may be radial in a similar manner as shown in FIG. 6. The conductor 10 may be other types of cookware such as a kettle or a coffee maker. By using the pattern of peaks and valleys described herein for cookware, it would be possible to use higher electrically conductive metals such as aluminum. The benefit of aluminum is higher thermal conductivity, which leads to more even heat distribution on the bottom of the cookware.

Figure 2:
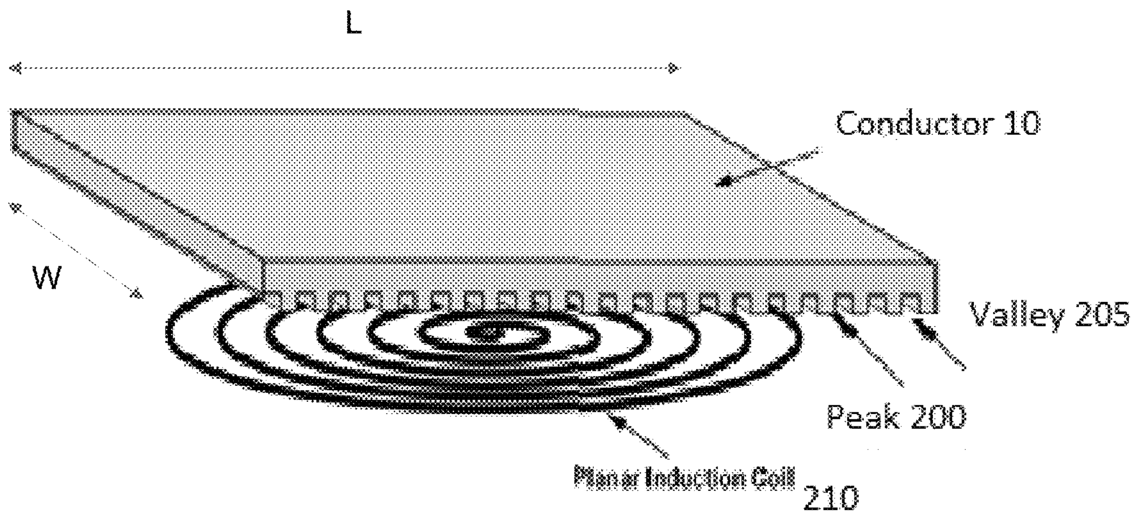
FIG. 2 is a diagram of an induction coil and a conductor in accordance with aspects of the disclosure.

The manner in which the electromagnetic field is applied to the conductor 10 may vary. The source of the field should be placed in such proximity to the conductor 10 that the electromagnetic field sufficiently cuts through the conductor 10 to generate a sufficient induced current to satisfy the heating requirements of the particular application. As shown in FIG. 2, a spiral coil (pancake) may be used for the inductor. Other coil topologies can be used such as helical, solenoidal, hair-pin, and combinations thereof.

The oscillating circuit 15 comprises an inductor (e.g., shown in FIG. 2), such as a coil inductor and a capacitor C (not shown in the figures). The inductance and capacitance determines the oscillating frequency. The inductance and capacitance values may be set as needed based on the application. The oscillating circuit 15 oscillates over a period of time.

The drive circuit 20 under the control of controller 30 drives the oscillating circuit 15 as needed. Any known drive circuit may be used and will not be described herein in detail.

The power source 25 may be any power source such a 120 VAC RMS or 240 VAC RMS.

A controller 30 used herein refers to any component or group of components that individually or collectively control the drive circuit 20. For example, the controller 30 may be a CPU, GPU, ASIC, analog circuit, or other functional logic, such as a FPGA, PAL or PLA. In the case of a CPU or GPU, the CPU or GPU may be executing instructions that are programmed in a computer readable storage device, such as a memory.

The memory may be, but not limited to, RAM, ROM and persistent storage. The memory is any piece of hardware that is capable of storing information, such as, for example without limitation, data, programs, instructions, program code, and/or other suitable information, either on a temporary basis and/or a permanent basis.

The use of an AC induction field to heat the conductor 10 provides for an efficient instant on-demand heating.

Figure 11:
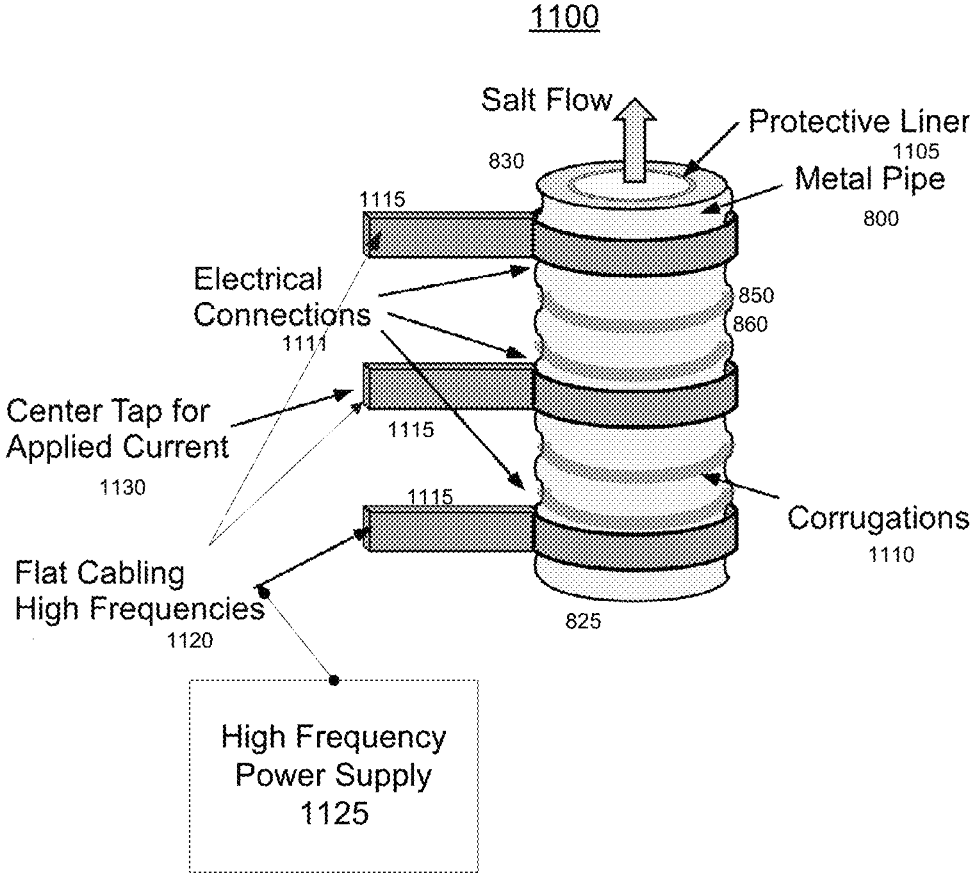
FIG. 11 is a diagram of another heating system in accordance with aspects of the disclosure.

The conductor 10 may be made of any conductive material capable of producing controlled eddy currents when exposed to an AC electromagnetic field or produce heating when exposed to Alternating Current (AC) which is directly connected to the conductor. FIG. 11 shows a heating system 1100 where the conductor, e.g., pipe, is heated via the direct connections.

The conductor 10 may be a solid block or slab of conductive material, a foam, a solid sheet of conductive material (such as steel alloy or nickel alloy), or a conductive mesh (such as conductive screen), or wool (such as steel wool), or a rod, pipe or bar or conductive material formed into cookware, examples of which are described above. In other aspects of the disclosure, the conductor 10 may be porous such as a porous graphite foam as described in U.S. Pat. No. 9,739,501, issued on Aug. 22, 2017, which is incorporated herein by reference.

Heating of the conductor 10 is determined by the following equation, where I is the induced current (for induction heating) or the AC directly connected and R is the bulk resistance along the current path, whose value is determined by the resistivity of the material and the geometry presented to the inducing magnetic field (for the induction heating) or the geometry presented to the AC directly connected:

$$P=i^2R \tag{1}$$

It is not desirable to increase I, solely to increase the heating. Thus, in accordance with aspects of the disclosure, conductors 10/10A/10B (and heat pipe 800) are disclosed with increased effective resistance (resistance which is seen by the current (induced or directly connected)).

FIG. 2 depicts a conductor 10 in accordance with aspects of the disclosure. FIG. 2 depicts the conductor 10 proximate to an induction coil 210 (which is a component of the oscillating circuit 15). The conductor 10 has a predetermined surface pattern (also referred to herein as an extended path geometry). The surface having the predetermined surface pattern is a surface which faces the induction coil 210 (or surface which the AC is applied). The predetermined surface pattern increases the effective resistance of the conductor 10 (resistance which is seen by the current (induced or directly connected)).

In an aspect of the disclosure, the predetermined surface pattern comprises a plurality of peaks 200 and a plurality of valleys 205. The plurality of peaks 200 and plurality of valleys 205 are configured to create a non-linear current path for the current (induced or directly connected). The arrangement of peaks/valleys generates grooves or channels in the conductor 10. These grooves/channels extend orthogonal to the current flow of the induced eddy currents, as shown in FIG. 3 (or AC which is directly connected).

Figure 3:
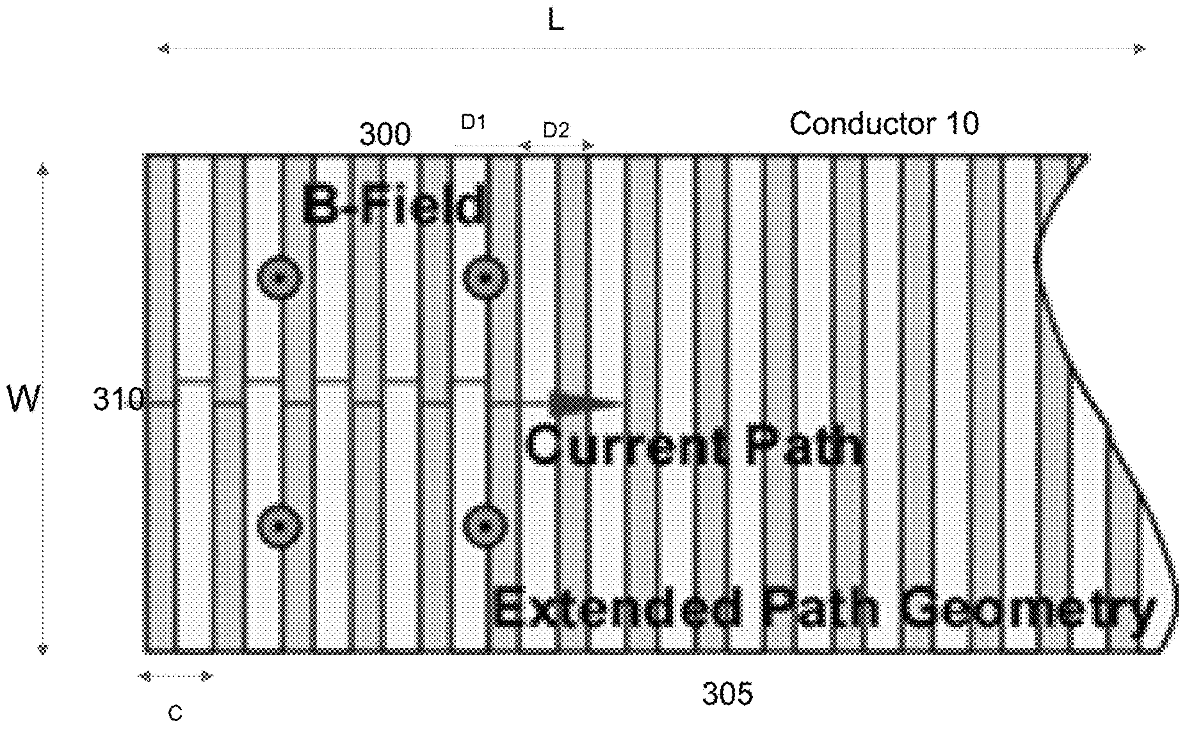
FIG. 3 is a plan view of a conductor in accordance with aspects of the disclosure showing an eddy current path.

FIG. 3 depicts a partial plan view of the conductor 10 for the conductor 10/induction coil 210 configuration depicted in FIG. 2. The induction coil 210 generates an electromagnetic field "B-Field" 300. As depicted in FIG. 3, the B-Field 300 is "out of the page" (orthogonal to the current flow) as represented by the dot in the center of the circles. The induced current flow is directed to the right (as viewed). However, due to the arrangement of the peaks/valleys, the induced current flow (current path) flows through the extended path geometry 305 created by the peaks 200 and valleys 205. The "extended path geometry" is extended with respect to a flat surface facing the induction coil. The extended path geometry increases a path for the eddy currents to flow, which increases the effective resistance as seen by the current. As shown in FIG. 3, the grooves/channels, e.g., valleys between two peaks, extend orthogonally to the current path 310 (extend in the width direction W).

In contrast, in a known conductor, the current path for the eddy current is substantially linear.

As depicted in FIG. 3, a length of one cycle, e.g., the length of a peak and a length of a valley, is a cycle C. In FIG. 3, the peaks/valleys are cyclically located on a length L of the surface facing the induction coil 210. Also, as depicted, the distance between adjacent peaks are the same, e.g., D1=D2. By having the same distance between adjacent peaks, a uniform eddy current may be achieved. In other aspects of the disclosure, the distance between adjacent peaks may be different in order to localize an increase in the effective resistance. The distance may be set based on a specific application. For example, where a desired heating is localized on a given surface in a center of the surface, the distance between adjacent peaks may be smaller than where the heating is not desired.

In FIG. 3, the non-linear current path 310 is shown with an arrow. The arrow traverses the peaks 200 and valleys 205.

Additionally, as shown in FIGS. 2 and 3, a length of a peak and a length of a valley are the same (duty cycle equals 50%). However, in other aspects of the disclosure, the lengths may be different.

Further, as shown in FIG. 2, the height of the peaks, e.g., difference between the peak and the valley, are uniform across the length L of the surface of the conductor 10. However, in other aspects of the disclosure, the heights may be different based on the specific application to have different heating amounts across the surface.

In other aspects of the disclosure, the surface may have different peaks 200 and valleys 205 in order to achieve the non-linear current path. For example, the surface may have an irregular topology having multiple different heights and lengths.

Additionally, in accordance with aspects of the disclosure, the height of the peaks, difference between the peak and the valley, may be set according to the resistivity of the material and the frequency of the oscillating circuit 15. The difference in height is set to less than the skin depth. The skin depth is a function of both the resistivity of the material and the frequency. For example, the skin depth decreases with an increase in frequency, which in turn increases the apparent resistance. Thus, for lower frequencies, a relative height of the peaks (difference in heights of peaks and valleys) is increased. For example, the relative height may be set to 1 mm to 10 mm based on the drive frequency. However, increasing the operating frequency increases the cost of the equipment, such as the drive circuit 20 used to drive the oscillating circuit 15.

While FIG. 2 depicts the surface facing the induction coil 210 as having a square-wave shape, the surface may have other shapes such as a sine wave (with no right angles) and the shape of the surface is not limited to the depicted shape.

In an aspect of the disclosure, the conductor 10 having the predetermined surface pattern may be made using a mold. The mold may have a cast to make the predetermined surface pattern. A raw uncured conductive material may be poured into the mold for forming the conductor 10.

In another aspect of the disclosure, the conductor 10 having the predetermined surface pattern may be made using a conductive block and the valleys manually created by removing certain portions of the conductive block, e.g., machining the part. In other aspects of the disclosure, a mask may be used in conjunction with particle etching such as sand-blasting or soda-blasting (or other types of blasting) to selectively remove material according to a mask pattern. In other aspects of the disclosure, laser ablation may be used to selectively remove material.

Further, in other aspects of the disclosure, additive manufacturing may be used to generate the conductor 10 having the predetermined surface pattern. The conductor may be printed using a conductive material via 3-Dimensional printing. In accordance with this aspect of the disclosure, the predetermined surface pattern is programmed into the 3-Dimensional printer and the conductor is created layer-by-layer. For example, the conductor may be created from aluminum, titanium, nickel, or iron as well as their alloys, via 3-D printing. Other materials may also be used.

In other aspects of the disclosure, the predetermined surface pattern may be created via chemical processing where the conductive material is removed via a chemical reaction, such as acid treatment in predefined areas of the material. A mask can be used with this type of treatment so that an acid (or base) creates a specific pattern by selective removal.

In an aspect of the disclosure, where a porous graphite foam conductor is used, such as described in U.S. Pat. No. 9,739,501, issued Aug. 22, 2017, which is incorporated by reference herein, additional peaks and valleys may be generated using milling techniques or other etching processes. In a porous graphite foam conductor, random pockets may exist, which are formed by gas generation. However, since the pockets are random, the surface may not be controlled to be regular or cyclical and therefore, the heating may be inconsistent over the length of the conductor. In accordance with aspects of the disclosure, in addition to the random pockets, the conductor 10 has a predetermined surface pattern, thus enabling control of the effective resistance as seen by the current to control the heating.

Figure 4:
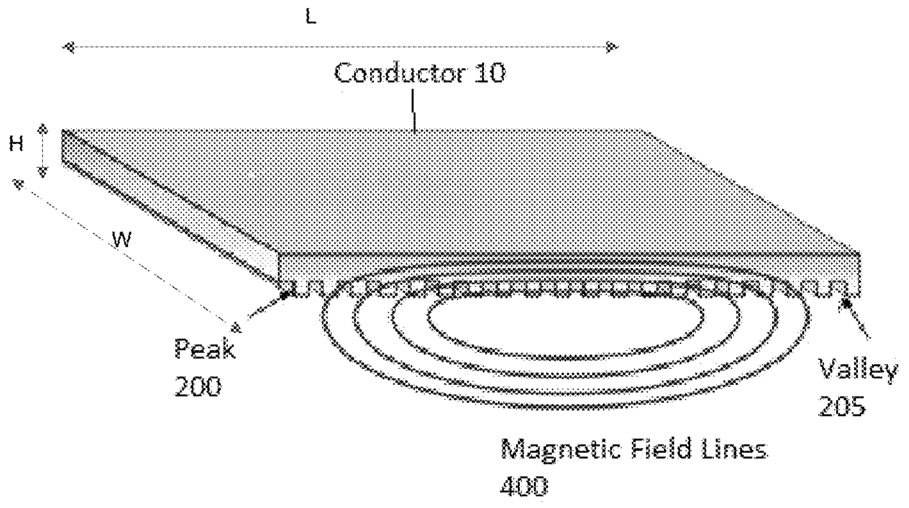
FIG. 4 is a diagram of a conductor in accordance with aspects of the disclosure showing a magnetic field gradient.

FIG. 4 depicts a conductor in accordance with aspects of the disclosure. FIG. 4 depicts the electromagnetic field lines cutting through the conductor 10 (peaks and valleys 200/205).

The material or materials which make up the conductor impact the manner in which the lines cut through the conductor 10. In an aspect of the disclosure, this may be controlled by using a plurality of different materials for the conductor 10. For example, different layers of the conductor may be made from different materials. Since the resistivity is a function of the material type (and also skin depth), by having different materials on or near the surface (facing the induction coil 210), the effective resistance that the current sees may be further controlled (the effective resistance also affects the field lines).

Figure 5:
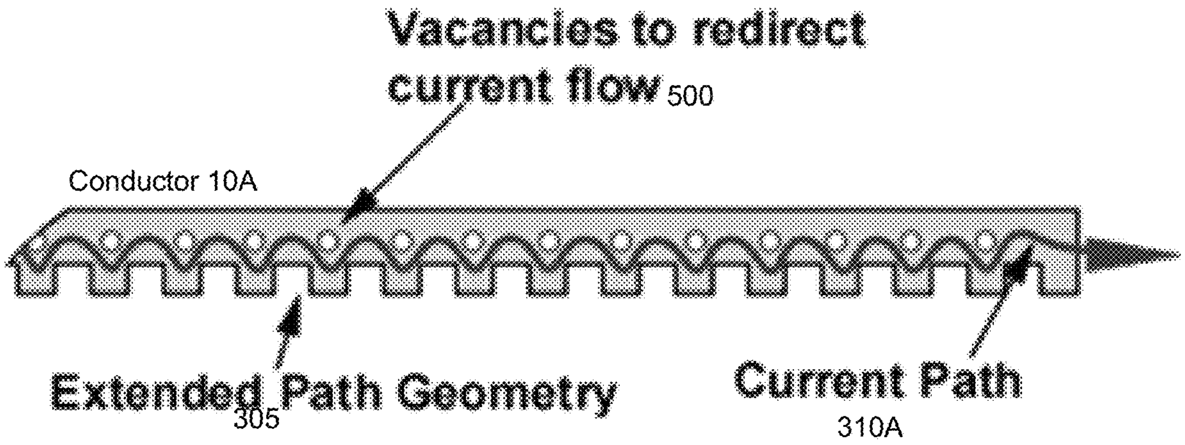
FIG. 5 is a sectional diagram of another conductor in accordance with aspects of the disclosure showing a current path through the extended path geometry.

FIG. 5 depicts a sectional view of a conductor 10A in accordance with other aspects of the disclosure. As depicted in FIG. 5, the conductor 10A comprises the predetermined surface pattern (extended path geometry 305) having the peaks 200 and the valleys 205. Additionally, the conductor 10A also comprises gaps (vacancies) 500 to redirect the current flow. These gaps (vacancies) 500 are adjacent to the peaks 200. In an aspect of the disclosure, each peak 200 has a corresponding gap (vacancy) 500 adjacent thereto. The gap 500 is aligned with the peak 200. Due to the skin depth (the current decreases with depth), the gaps 500 redirect the current to flow through the peaks 200. Thus, the current path 310A extends though both the peaks 200 and valleys 205 as the current flows through the conductor 10A.

In an aspect of the disclosure, the gaps 500 may be generated by drilling a hole into the conductor 10A. In other aspects of the disclosure, the gaps 500 may be generated by the above-described means. Gaps 500 may be open volumes or slits or breaks in the material that prevents electrical current flow through them.

While FIGS. 2-5 generally depict conductors having rectangular cuboid in shape, the conductors are not limited to the same. For example height (thickness) of the conductor may vary as long as the surface facing the induction coil 210 has the features described herein.

For example, FIG. 6 depicts another conductor 10B having a circular profile. FIG. 6 is a plan view of the conductor 10B. As depicted, the peaks 200A and valleys 205A alternate. The peaks 200A and valleys 205A extend radially from the center of the conductor 10B. The peaks 200A and valleys 205A alternate and extend such that they are orthogonal to the direction of flow of the currents.

Figure 7:
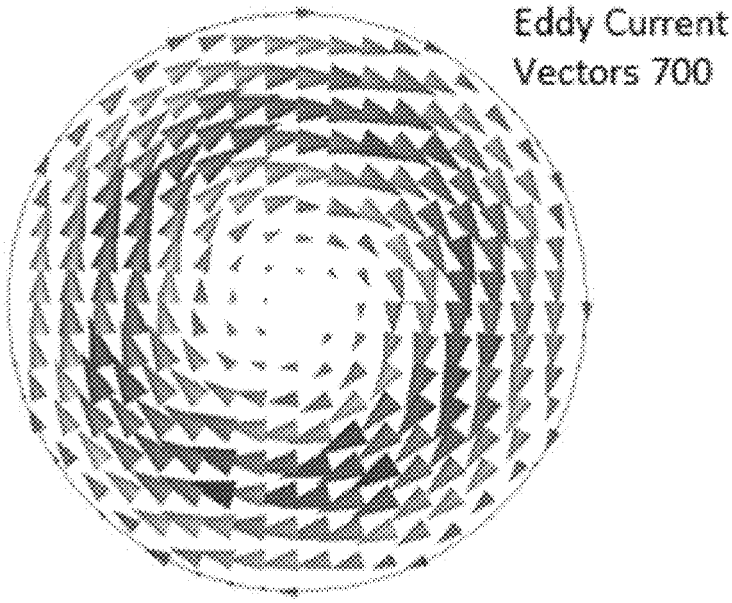
FIG. 7 is a diagram showing eddy current vectors in the conductor.

FIG. 7 depicts an example of the eddy current flow, e.g., vectors 700, which results from a planar induction coil (such as depicted in FIG. 2) being adjacent to a circular conductor as viewed in a plan view and being driven. As shown, the eddy current vectors 700 flow clockwise. The peaks/valleys 200A/205A which extend radially are orthogonal to the flow of the current thereby increase the current flow path from a flat surface.

Figure 8:
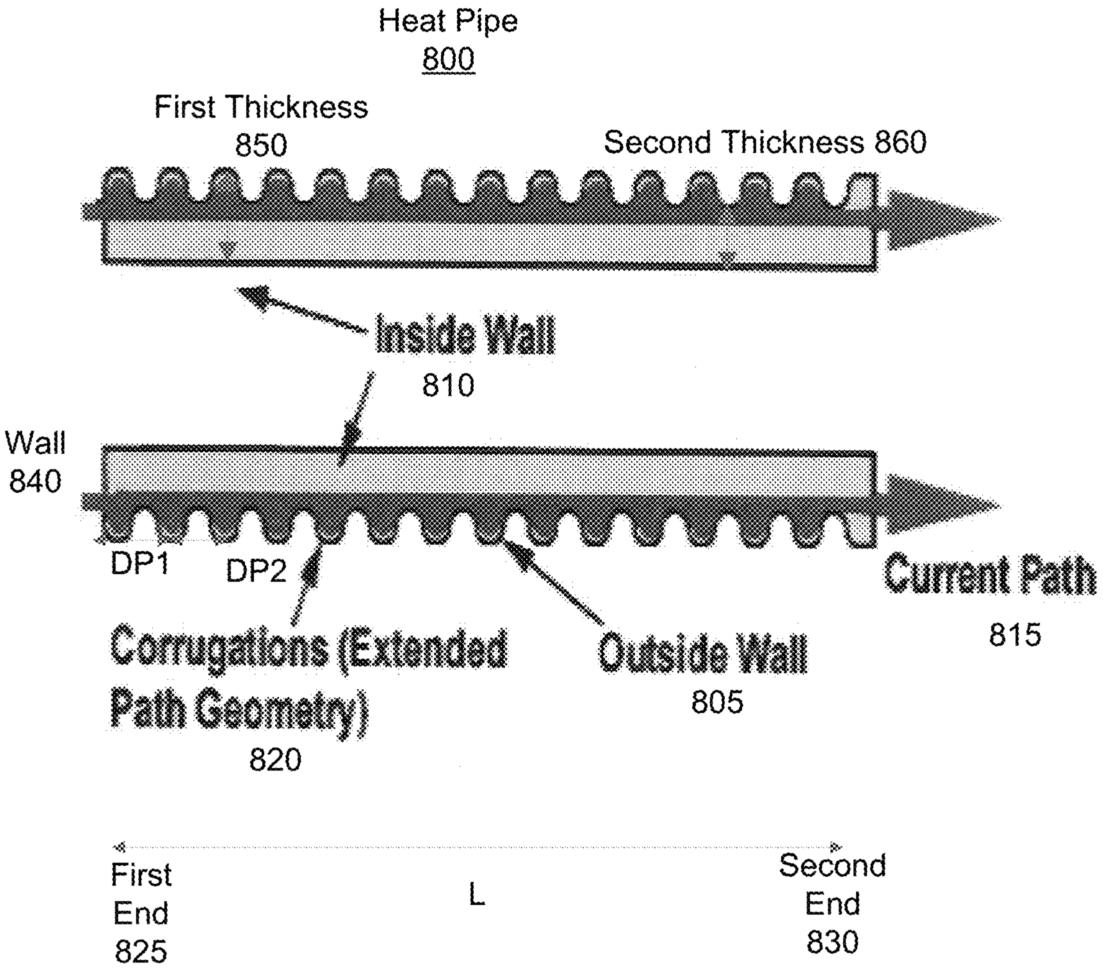
FIG. 8 is a sectional diagram of another conductor in accordance with aspects of the disclosure.

FIG. 8 depicts a sectional view of another example of a conductor in accordance with aspects of the disclosure. In this example, the conductor is a heat pipe 800. The heat pipe 800 may be used in the heating system 1 described in FIG. 1. In other aspects of the disclosure, the heat pipe 800 may be used in system 1100 where AC is directly applied, an example of which is illustrated in FIG. 11. The heat pipe 800 has a first end 825 and a second end 830. The first end 825 may be a heating target inlet and the second end 830 may be a heating target outlet. The distance between the first end 825 and the second end 830 is referred to herein as the length L of the heat pipe 800. The heat pipe 800 has a wall having an external surface referred to in the figure as "outside wall 805" and an internal surface referred to in the figure as "inside wall 810" (collectively wall 840). While FIG. 8 refers to the wall as an inside wall and outside wall, the wall may be made of the same material and be continuous. The terms inside and outside are used for descriptive purposes only. The external surface (outside wall 805) has a surface pattern. As depicted, the external surface is corrugated 820, e.g., has the extended path geometry, to achieve a non-linear current path 815. In an aspect of the disclosure, the internal surface (inside wall 810) has the same diameter throughout the length L. This allows the flow of the target through the pipe 800.

The external surface (outside wall 805) has peaks (first thickness 850) and valleys (second thickness 860) similar to described above. The distance between the internal surface and the external surface changes over the length L, from the first end 825 to the second end 830. As depicted, the wall 840 has a first thickness 850 and a second thickness 860. The first thickness 850 is thicker than the second thickness 860. The first thickness 850 and the second thickness 860 alternately repeat to form the non-linear current path, e.g., current path 815. The current (induced or directly connected) will follow the contours of the external surface (outside wall 805).

Once again, as shown in FIG. 8, the distance between adjacent peaks, e.g., DP1 and DP2, are the same. However, in other aspects of the disclosure, the distance may be different based on the application. For example, the distance between adjacent peaks near the first end 825 (inlet) may be greater than a distance between adjacent peaks near the second end 830. This may allow the target to heat slowly at the beginning and quicker at the end or vice versa.

In an aspect of the disclosure, the width of the peak is twice the skin depth.

In other aspects of the disclosure, as described above, the relative thicknesses between the first thickness 850 and the second thickness 860 for each peak/valley may be the same. In other aspects of the disclosure, the relative thicknesses may change. For example, the relative difference in thickness may be greater in the center of the pipe 800 than at either end 825 and 830 in order to achieve different non-linear current paths within the pipe 800. For example, the surface may have an irregular topology having multiple different heights and lengths over the length L of the heat pipe 800.

In an aspect of the disclosure, the oscillating circuit 15 will be driven at an operating frequency between 40 kHz and 1 MHz. In other aspects of the disclosure, the operating frequency may be between 250 kHz and 350 kHz (where a graphite foam is used).

Figure 10:
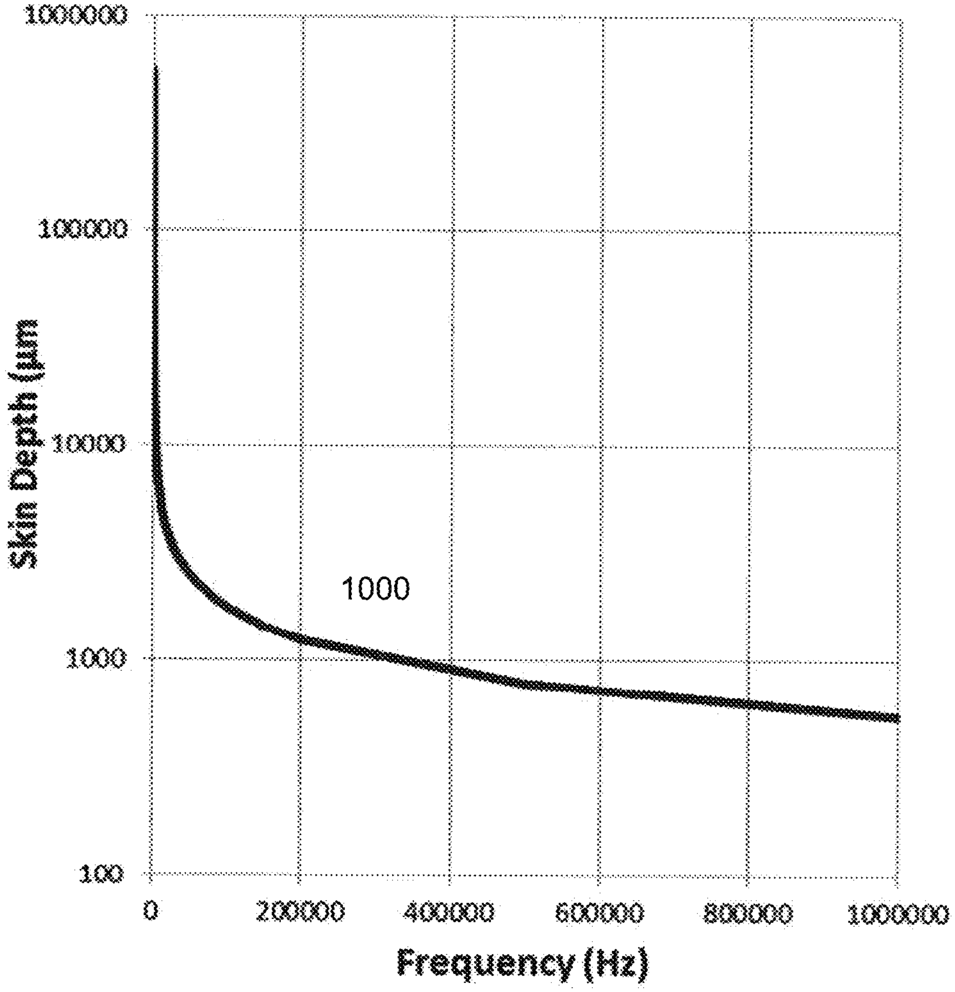
FIG. 10 is a graph showing a relationship between a frequency of the oscillating circuit and skin depth.

In an aspect of the disclosure, the relative thickness between the first thickness 850 and the second thickness 860 is based on the operating frequency of the oscillating circuit 15 (or frequency of the AC). FIG. 10 depicts an example of a relationship 1000 between the skin depth and the operating frequency. The skin depth is on the y-axis and the operating frequency is on the x-axis. In an aspect of the disclosure, the difference in thickness between the first thickness 850 and the second thickness 860 is greater than the skin depth (at the operating frequency). For example, when the operating frequency is 100 kHz, the difference in thickness between the first thickness 850 and the second thickness 860 may be greater than 1.75 mm (greater than the skin depth). When the operating frequency is 306 kHz, the difference in thickness between the first thickness 850 and the second thickness 860 may be greater than 1 mm.

However, the difference between the first thickness 850 and the second thickness 860 and minimum thickness for the second thickness 860 should also account for a required strength of the heat pipe 800 at the operating temperature and other operating conditions.

Additionally, as shown in FIG. 8, a length of a peak (first thickness 850) and a length of a valley (second thickness 860) are the same (duty cycle equals 50%) (e.g., the length in the current flowing direction). However, in other aspects of the disclosure, the lengths may be different, e.g., length of the first thickness may be greater than the length of the second thickness.

In other aspects of the disclosure, instead of being separate and discrete areas for the first thickness 850 (peaks) and the second thickness 860 (valleys), the pipe 800 may having a spiral rib extending from the first end 825 to the second end 830 forming both the first thickness and the second thickness (the spiral being the first thickness 850 and space between being the second thickness 860).

While FIG. 8 depicts the outside wall 805 as having a sine-wave shape, the surface may have other shapes such as a square-wave or a triangular wave and the shape of the surface is not limited to the depicted shape.

Although not shown in FIG. 8, the heat pipe 800 may also have the gaps (depicted in FIG. 5) to redirect the current flow into the peaks.

The heat pipe 800 may be made by any of the above-described processes, such as molding, machining, milling, using a mask, and additive manufacturing including 3-Dimension printing. For example, the heat pipe 800 may be formed from a pipe having a first thickness and machining portions of the pipe to have a second thickness by removing material. In an aspect of the disclosure, the shape follows the tooling shape including, but not limited to, sinusoidal, square, tooth, etc.

In an aspect of the disclosure, the external surface may be made from different conductive materials to achieve the different thicknesses. However, where different materials are used, the materials should have similar thermal expansion.

In other aspects of the disclosure, multiple pipes may be added together to create the heat pipe 800 where larger diameter pipe sections are added to an inner pipe to generate the heat pipe 800. The larger pipe sections may be attached via an adhesive to the inner pipe to create the heat pipe 800. In other aspects of the disclosure, the added sections may be attached by clamping on pre-formed, corrugated materials.

The inner and outer diameter of the heat pipe may be selected as needed for an application.

The heat pipe 800 may be constructed of a nickel alloy material. For example, an Inconel 617® pipe may be used. Other materials may be used and selected based on the material properties.

While it is desirable to select materials for high resistivity (in view of the power); however, material properties such as strength, electrical resistivity, and corrosivity are not independently selectable and an optimum blend of properties including high resistivity may not be possible without using the techniques described herein. The conductors described herein have an increased effective resistance over a conventional conductor (such as a heat pipe) and have an increase in the current path for the induced eddy current (and AC directly connected). Therefore, the conductors described herein are configured to achieve target heating while lowering the heating current and operating frequencies.

Figure 9:
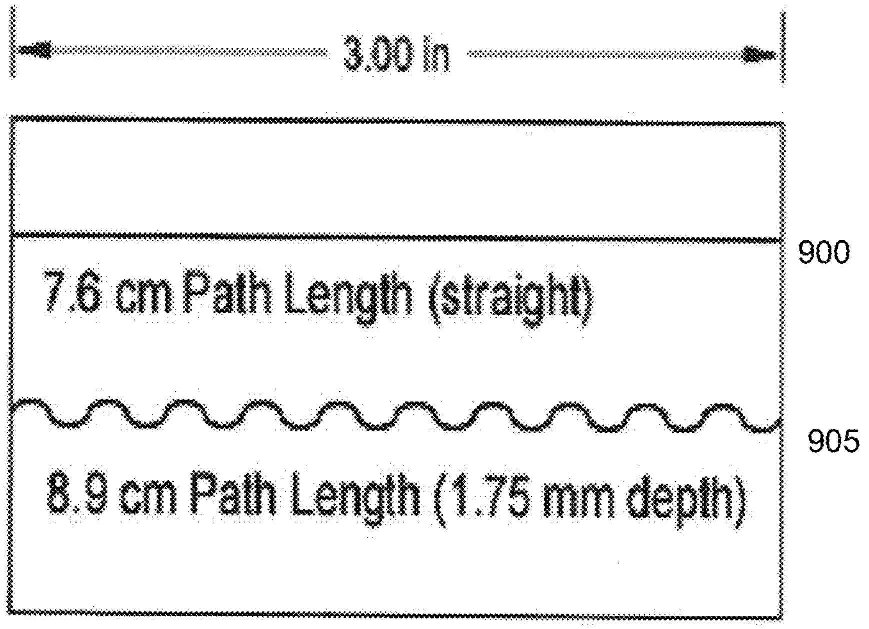
FIG. 9 is a diagram showing a comparison of an effective length of a current path with a straight surface verses a patterned surface in accordance with aspects of the disclosure.

FIG. 9 depicts a comparison of a current path length for a conventional 3 inch heat pipe having a flat or straight external surface verses a patterned external surface in accordance with aspects of the disclosure (over the same linear distance). In the conventional heat pipe (straight) external surface, the current path length is about 7.6 cm. However, for a patterned external surface with a 1.75 mm difference between the first thickness 850 and the second thickness 860 having a 1.3 cycles per centimeter, the current path length is about 8.9 cm. The effective extension of the current path length is about 17%. By increasing the cycles per centimeter, the effective extension of the current path length increases (for the same depth, e.g., difference between the first thickness 850 and the second thickness 860).

FIG. 11 depicts another heating system 1100 in accordance with aspects of the disclosure. The heating system 1100 may be used for heating salt. The salt flow is shown in FIG. 11 with an arrow. The flow is from a first end 825 to a second end 830 through the heat pipe 800 (metal pipe). The heat pipe has a protective liner 1105. The protective liner 1105 reduces corrosion due to contact of the metal pipe with the flowing salt. In the heating system 1100, an AC is directly applied to the pipe 800. The pipe 800 has the corrugations 1110 described above. The wall has a first thickness 850 and a second thickness 860 (peaks and valleys).

As shown in FIG. 11, there are three clamps 1115 around the heat pipe 800. Two of the clamps are used for ground, e.g., the clamps on the ends. The middle clamp is used for the applied high frequency voltage, e.g., identified in the figure as "center tap for applied current 1130 (application of a high positive and negative voltage to cause current to flow toward/from ground). Each clamp extends around the circumference of the pipe 800 and provides a path for the current transfer to the pipe. Since a high current is applied to the pipe 800, in an aspect of the disclosure, the clamps 1115 are thick to provide a high surface area in contact with the pipe 800. The surface area in contact with the pipe is referenced in FIG. 11 as "electrical connections 1111". High frequency/High current cabling 1120 are attached to the clamps. In an aspect of the disclosure, the cabling 1120 may be flat cabling. The frequency and amount of current applied is application specific. For example, to heat a molten salt to a temperature between 600 C-800 C, an AC may be greater than 1000 A. The operating frequency may be 50 kHz to 500 kHz and higher.

A high frequency power supply 1125 is coupled to the cabling 1120. In an aspect of the disclosure, the coupling may via a transformer for isolation. The system 1100 may also include temperature sensors (not shown) arranged at predetermined positions along the heat pipe 800 and a controller (not shown) to adjust the frequency and current supplied based on the sensed temperature. The high frequency power supply 1125 may receive as input, power from a power panel. For example, a 480 VAC 3-phase power panel may be used.

In addition to having different relative heights of the peaks and valleys over the length L of the pipe 800, different lengths of the peaks and valleys in the direction of current flow over the length L and different distances between adjacent peaks, variable heating along the length L of the pipe 800 may be achieved by adding additional clamps along the length L to have segmented heating zones. For example, additional pairs of clamps may be added between the center tap 1130 (center clamp) and end clamps where a different VAC is applied to each pair of clamps.

A system of applying AC to a pipe 800 is not limited to the system 1100 depicted in FIG. 11. Other system and methods may be used. For example, the clamps may be used as supports for the cables and the cables directly contact the pipe to apply the VAC and grounds, respectively.

The terms "Controller" as may be used in the present disclosure may include a variety of combinations of fixed and/or portable computer hardware, software, peripherals, and storage devices. The "Controller" may include a plurality of individual components that are networked or otherwise linked to perform collaboratively, or may include one or more stand-alone components. The hardware and software components of the "Controller", of the present disclosure may include and may be included within fixed and portable devices such as desktop, laptop, and/or server, and network of servers (cloud).

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A heating system comprising:

a conductive pipe having an inlet, an outlet and a wall connecting the inlet and the outlet, where a thickness of the wall varies over a length of the conductive pipe from the inlet to the outlet, the wall having at least a first thickness and a second thickness different from the first thickness, where the first thickness and the second thickness alternate, the wall having the first thickness and the second thickness form a non-linear current path for current; and an oscillator circuit configured to generate an electromagnetic field having an oscillating frequency, wherein the non-linear current path is for current which is induced to flow when the conductive pipe is exposed to the electromagnetic field generated by the oscillating circuit.

2. The heating system of claim 1, wherein the current is alternating current (AC) which is applied by connecting cables to the conductive pipe.

3. The heating system of claim 1, wherein the wall comprises an internal surface and an external surface, wherein the external surface is corrugated to form the first thickness and the second thickness.

4. The heating system of claim 1, wherein a length of the first-thickness, in a direction of a current flow, is greater than the length of the second thickness in the direction.

5. The heating system of claim 1, wherein a difference between a thickness of the first thickness and the second thickness is greater than a skin depth at an oscillating frequency.

6. The heating system of claim 1, wherein an external surface of the wall comprises a spiral pattern to form the first thickness and the second thickness.

7. The heating system of claim 5, wherein the oscillating frequency is 100 kHz and the difference is greater than 1.75 mm.

8. The heating system of claim 1, wherein a distance between adjacent first thicknesses, in a direction of a current flow, changes between the inlet and the outlet.

9. The heating system of claim 8, wherein the distance between adjacent first thickness in the direction is smaller closer to the inlet.

10. The heating system of claim 5, wherein the difference between the thickness of the first thickness and the second thickness changes between the inlet and the outlet.

11. The heating system of claim 1, wherein the wall has gaps disposed adjacent to and aligned with the first thickness, respectively.

12. The heating system of claim 3, wherein the internal surface has a protective liner.

13. The heating system of claim 12, wherein the heating system is configured to heat salts to a temperature between 600 C-800 C.

14. The heating system of claim 1, wherein the oscillator circuit comprises a high frequency power supply and a plurality of clamps, each clamp configured be positioned around the conductive pipe and connecting cables respectively connecting the plurality of clamps to the high frequency power supply.

15. The heating system of claim 14, wherein the plurality of clamps comprise a first clamp, a second clamp and at least a third clamp, the first clamp being positioned adjacent to the inlet, the second clamp being positioned adjacent to the outlet, and the at least a third clamp being positioned between the inlet and the outlet and the first clamp and the second clamp being connected to ground.

* * * * *